E. J. FISCHER.
Methods of Preventing the Fraudulent Alteration of Bank Checks, Drafts, &c.

No. 147,382.  Patented Feb. 10, 1874.

WITNESSES  INVENTOR

UNITED STATES PATENT OFFICE.

ERNEST J. FISCHER, OF PHILADELPHIA, PENNSYLVANIA.

IMPROVEMENT IN THE METHODS OF PREVENTING THE FRAUDULENT ALTERATION OF BANK-CHECKS, DRAFTS, &c.

Specification forming part of Letters Patent No. 147,382, dated February 10, 1874; application filed January 8, 1874.

*To all whom it may concern:*

Be it known that I, ERNEST J. FISCHER, of Philadelphia, in the county of Philadelphia and State of Pennsylvania, have invented a certain new and useful Improvement or Method for Preventing the Fraudulent Alteration of Checks, Drafts, &c.; and I do hereby declare the following to be a full, clear, and exact description of the invention, such as will enable others skilled in the art to which it pertains to make and use it, reference being had to the accompanying drawings, which form part of this specification, in which—

Figure 1:
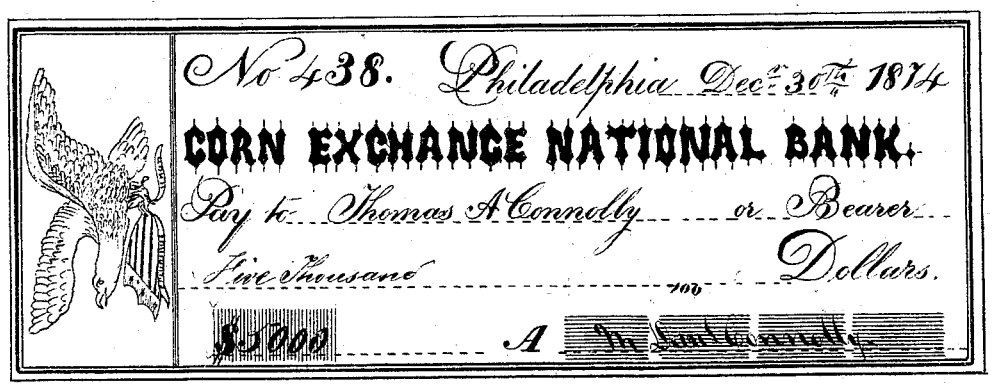
Figure 2:
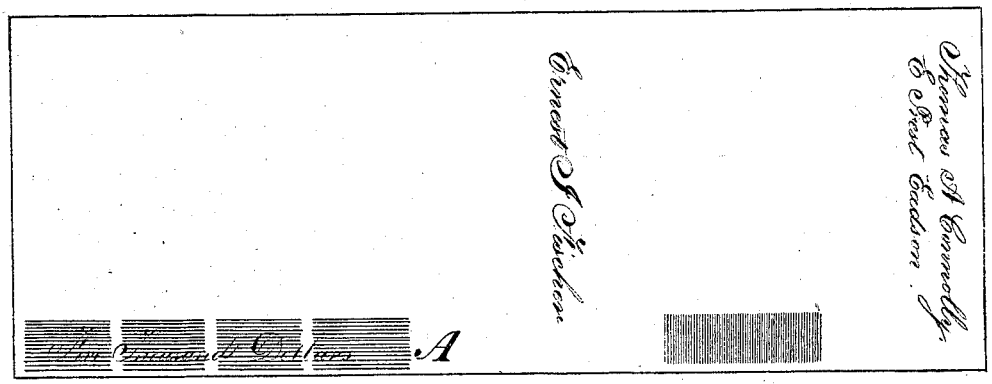

Figure 1 is a plan of face of check with my improvement applied. Fig. 2 is a plan of back of said check.

My invention consists of a check, draft, or other monetary document having the paper incised or slit at the place where the signature is written and the amount or value expressed, as hereinafter fully set forth.

In the drawings are represented two sides of a check exhibiting my improvement, which is applied as follows: The check is first filled in and signed in the usual manner. It is then turned over or inverted, and the amount for which it is drawn written in words or figures at a place upon the back directly opposite that at which the signature is inscribed. The paper is now cut or slit, as shown at A, by any suitable means, through the signature, the incisions being so close together that at least two or three of them will cross each letter or figure.

A check or draft thus treated cannot be fraudulently altered with success. Should it be attempted to alter it, by erasing, by means of chemicals, the value written or expressed, and writing in a new amount, it will be found quite or wholly impossible to write upon the incised portion of the paper; and should this obstacle be overcome, the ink with which the new valuation must be written will flow through the incisions, defacing the signature and making the fraud apparent.

I am aware that punctured checks and drafts have been employed for the same purpose as my invention, the perforations being made in the paper at the place or places where the value of the check is expressed; but this method does not afford certain protection, as, notwithstanding the puncturing, the letters or figures expressing the value may be erased by chemicals, and a new amount written in at the same place. Should the ink flow through and appear upon the back, as there is nothing written there, it may be easily taken off without leaving indications; but with my improvement, if the valuation be changed by erasing the words or figures expressing the same, and writing in different ones, the signature will be surely defaced or marred to that extent that an imposition or fraud cannot be successfully practiced.

Instead of writing the amount on the back of the document, as just described, it may be written on the face over the signature in a different ink, as is sometimes done, and the paper then slit, which modification is within the spirit of my invention.

The essence of the invention, then, consists in writing the amount back of or across the signature, and then slitting the paper through both amount and signature, so that if the former be changed, the latter will be *ipso facto* defaced.

It is obvious that puncturing would not answer instead of slitting, for if the perforations be close together, as they needs must be with a fine signature, or even with the small letters of an ordinary signature, said signature will be rendered almost or wholly illegible, a very considerable portion of each letter being cut out; but this is not the case with the slits, as no particle of the paper is thereby removed, and the signature remains as plain to be seen as if written on engraved lines, which the incisions closely resemble.

The slits may be vertical, oblique, or horizontal. I prefer the latter, so that the instrument with which the slits are to be made may contain as few blades as possible, and still effect the desired result at a single stroke or movement.

In order to obtain lateral or retaining strips, as shown at *a*, when horizontal slitting is adopted, the blade of the cutting-tool should be notched. When vertical or oblique slits are made, as they will be each only about half an inch long, it will be unnecessary to have retaining-strips, and a notched tool need not then be employed.

What I claim as my invention is—

1. The method herein described of preparing checks, drafts, or other monetary documents to prevent fraudulent alteration of the same, consisting in inscribing on the face or one side of the paper or document the signature, and on the reverse side, and immediately opposite and over the signature, the amount or value, and then canceling the same by cutting slits or incisions in the paper through said inscriptions, substantially as described.

2. A check, bank-note, or other monetary document, constructed as above described, having the signature on one side, the amount or value on the reverse side, immediately opposite and over the signature, and slits or incisions passing through both inscriptions, substantially as and for the purpose set forth.

In testimony that I claim the foregoing I have hereunto set my hand this 31st day of December, 1873.

ERNEST JULIUS FISCHER.

Witnesses:
GEO. C. SHELMERDINE,
M. DANL. CONNOLLY.